Aug. 21, 1928.  
W. L. FRY  
SEAT COVER SUPPORT  
Filed Feb. 3, 1928  
1,681,180
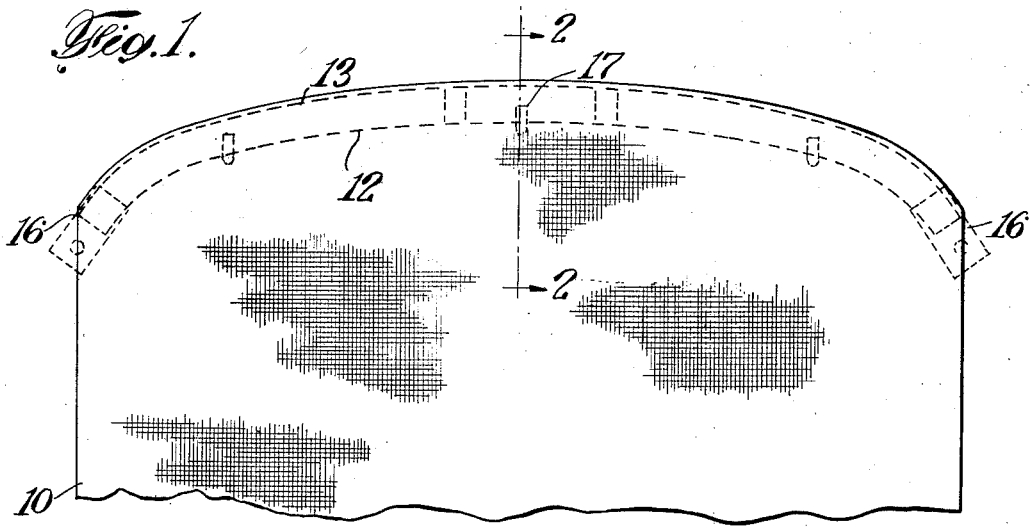
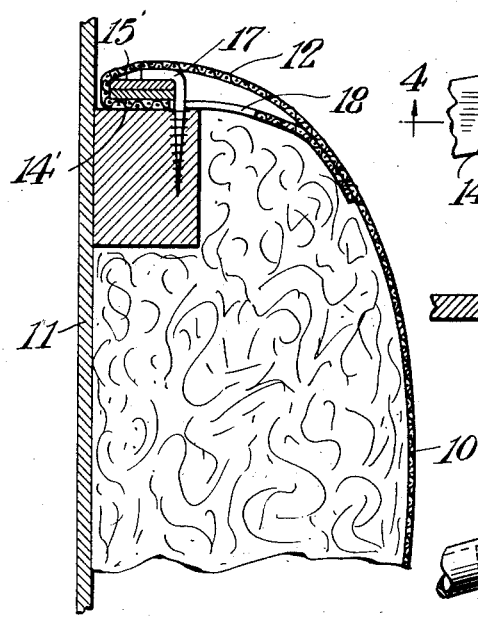
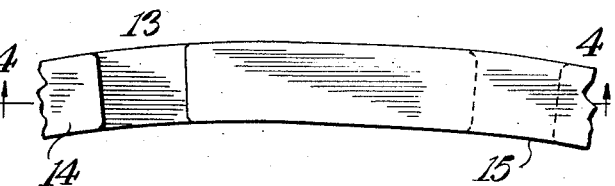
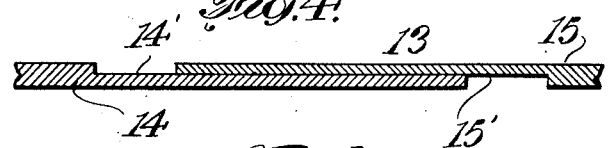
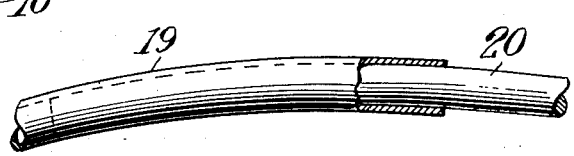
INVENTOR.  
Walter L. Fry.  
BY  
Hoguet & Neary  
ATTORNEYS.

Patented Aug. 21, 1928.

1,681,180

UNITED STATES PATENT OFFICE.

WALTER L. FRY, OF SCARSDALE, NEW YORK.

SEAT-COVER SUPPORT.

Application filed February 3, 1928. Serial No. 251,549.

My invention relates to improvements in seat cover supports and in the combination with such supports of the cover and seat. In my application for Letters Patent of the United States, Serial No. 210,804, filed August 5, 1927, I have shown a seat cover adapted to cover a seat back and having at the top a hem or keeper through which extends a reinforcing bar which is attached to the upper part of the seat to hold the cover in the right position to extend over the front part of the seat back. I find that it is desirable in some cases to have this reinforcing bar, which conforms to the contour of the seat or part to which it is attached, made in a plurality of sections so that the bar may be readily adjusted as to length and thus made to fit a seat top of any reasonable width and to support a cover in the desired position.

The ends of the bar may be confined in sockets or supports, if desired, and the parts of the bar can be slidably connected together in any approved way, but the bar as a whole should conform to the contour of the seat back or part to which it is attached. Such a bar forms as good a support as a rigid bar and is more readily adjusted to slight variations in width of the support for the bar and the cover which the bar supports.

Reference is to be had to the accompanying drawings forming a part of this specification, in which similar reference characters indicate corresponding parts in all the views.

Figure 1 is a broken plan view of the structure embodying my invention.

Figure 2 is a cross section on the line 2—2 of Figure 1.

Figure 3 is a broken plan on an enlarged scale of the connected bar parts.

Figure 4 is a section on the line 4—4 of Figure 3.

Figure 5 is a broken detail of a modified form of a reinforcing or contour bar, and Figure 6 is a broken detail of another modification.

In the drawings, the cover 10 is adapted to extend from the top of the seat back 11 over the front part of the said seat back and to cover the same. It may be an ordinary slip cover of any approved material or design and, as in my prior case above referred to, it has at the top a keeper or hem 12 which receives a reinforcing bar adapted to be attached to the seat top or adjacent support and be concealed by the keeper and yet form a secure support for the cover. It is desirable to have this reinforcing or contour bar adjustable as to length and made in sections. There can be any desired number of these but two meeting sections slidable with relation to each other are sufficient. The adjustment can be in a great many forms without affecting the invention.

As illustrated, I have shown the bar, designated as a whole by the numeral 13, as composed of two parts 14 and 15 of the desired contour, which at the outer ends are held in sockets 16 adapted to be attached to the seat or adjacent part, and the meeting portions of the bar members 14 and 15 are thinned or reduced as shown at 14' and 15' so that they may slide one on the other. The bar is held down to the seat by hooks 17 or equivalent members which are secured to the seat and extend through holes 18 in the underside of the cover to engage the reinforcing bar within the hem 12. This is disclosed in my prior application above referred to. If such a hook is placed opposite the meeting parts of the bar members 14 and 15 it will serve to prevent displacement as no great strain is imposed on the bar. It will be readily seen that such a bar can be easily varied as to length to adapt itself to the width of the seat or of the cover.

In Figure 5 I have shown a slight modification of the bar to illustrate the fact that the adjustment may be of other kinds than that described. As here shown, the two parts 19 and 20 of the reinforcing bar telescope one within the other and it will be seen from the description given that numerous other adjustments might be had without affecting the invention.

In Figure 6 I have shown still another way of making the contour bar adjustable. In this instance the adjacent parts 21 and 22 are screw threaded at their approaching ends and are connected by a turnbuckle 23 so that by turning this the bar can be made longer or shorter as desired.

I claim:

1. The combination with a seat back and cover therefor, of a reinforcing bar composed of a plurality of adjustable sections, socket members to receive and support the outer ends of the bar, a hem or keeper on the cover enclosing the bar, and means entering the hem and engaging the bar to hold the latter upon the seat top.

2. The combination with a seat back and cover therefor, having a hem at its upper edge, of a longitudinally adjustable reinforcing bar extending through the hem and having parts sliding one on the other, said bar conforming to the shape of the seat top, means on the back rest to receive and support the ends of the reinforcing bar and means entering the underpart of the hem and engaging over the meeting parts of the bar to hold the latter in place.

In testimony whereof, I have signed my name to this specification this 26 day of January, 1928.

WALTER L. FRY.